(12) United States Patent
Larsson et al.

(10) Patent No.: US 7,295,855 B1
(45) Date of Patent: Nov. 13, 2007

(54) TRANSMIT POWER REDUCTION MODE FOR CDMA MOBILE STATIONS

(75) Inventors: Torbjorn Larsson, San Diego, CA (US); Ramon A. Khalona, Carlsband, CA (US)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 09/522,654

(22) Filed: Mar. 10, 2000

(51) Int. Cl.
  *H04Q 7/005* (2006.01)
(52) U.S. Cl. .......................... 455/522; 455/13.4; 455/69
(58) Field of Classification Search ................ 455/522, 455/69, 13.4, 126, 33.1
  See application file for complete search history.

(56) References Cited

U.S. PATENT DOCUMENTS

| | | | |
|---|---|---|---|
| 5,574,972 A * | 11/1996 | Hulbert | 455/33.1 |
| 5,604,766 A | 2/1997 | Dohi et al. | |
| 6,085,067 A * | 7/2000 | Gallagher | 455/13.1 |
| 6,298,241 B1 * | 10/2001 | Hong | 455/522 |
| 6,311,070 B1 * | 10/2001 | Tong | 455/522 |
| 6,330,455 B1 * | 12/2001 | Ichihara | 455/522 |
| 6,442,155 B1 * | 8/2002 | Suk | 370/342 |

FOREIGN PATENT DOCUMENTS

| | | | |
|---|---|---|---|
| EP | 1024606 | * | 2/2000 |
| GB | 2292278 | * | 2/1996 |

OTHER PUBLICATIONS

Official Action dated Jan. 6, 2004 in corresponding Japanese Application No. 2001-065603 with English translation.
Patent Abstracts of Japan: JP 08-32513 Feb. 1996.

* cited by examiner

*Primary Examiner*—George Eng
*Assistant Examiner*—Brandon J. Miller
(74) *Attorney, Agent, or Firm*—Harness, Dickey & Pierce, PLC (57) ABSTRACT

The power control system includes a run-length counter and a processor. The counter is configured to receive and count power up commands indicating commands to increase power, and to generate a run-length count. The processor provides a transmit power level based on comparison of previous power levels and the run-length count with specified thresholds. The system has a capability to generate transmit power level based on short-term statistics of the previous transmit power levels.

24 Claims, 11 Drawing Sheets

TRANSMIT POWER REDUCTION MODE FOR CDMA MOBILE STATIONS

BACKGROUND

This disclosure relates to wireless communication systems.

Terrestrial wireless communication systems based on Code Division Multiple Access (CDMA) employ mobile transmit power control to mitigate the effects of the so-called "near-far" problem. The near-far problem arises when a base station is in communication with multiple mobile stations located at different distances from the base station. The difference in power level received at the base station from one mobile unit located near the base station and another mobile unit located farther away can be huge because of the high path loss associated with terrestrial radio propagation. Ideally, the use of orthogonal spreading codes in CDMA should allow multiple transmitters to co-exist within the same frequency band without introducing mutual interference, irrespective of the received power level. However, due to a lack of synchronization among the mobile transmitters, as well as other factors such as time dispersion, such perfect isolation of the signals received from different mobile stations cannot be achieved in practice.

The presence of multiple signals arriving at the base station antenna simultaneously also causes an effect called multipath. Signals that are in phase will add while signals out of phase will subtract. Shadowing effects, as well as rapid fading caused by multipath propagation, further increases the variation in received power. The multipath fading is caused by a variation of the amplitude or relative phase of one or more of the frequency components in the received signal. In particular, multipath fading may result in the received power falling 20-30 dB below the average level. Successive minima occur roughly every half of the carrier frequency wavelength. This can be approximately 8 cm in a 1900 MHz Personal Communications Systems (PCS) band.

A well-known remedy to the near-far problem is to control the transmit power of each mobile in such a way that all the signals arrive at the base station with approximately the same Signal-to-Interference Ratio (SIR), independent of where the mobile stations are located. Furthermore, since the total interference level generated by all the mobile transmitters determines the system capacity (i.e. maximum number of simultaneous calls), it is desirable to set the target SIR value to no higher than required to ensure the desired Quality of Service (QoS). The QoS is commonly measured in terms of Frame Error Rate (FER). In practice, the requested QoS and thus the target SIR may vary from one mobile unit to another.

The North American CDMA system, as specified by Telecommunications Industry Association (TIA) standard IS-95, and its future evolution IS-2000, uses two fundamentally different mechanisms for power control. The first is "open-loop" power control, intended to compensate for large-scale signal strength variations caused by propagation path loss and shadowing effects. Such variations can be considered as being frequency-independent. As a result, the large-scale variations in the forward link (i.e. base-to-mobile) and the reverse link (i.e. mobile-to-base) can be considered identical, even when the two links operate in different frequency bands. In open-loop power control, the mobile takes advantage of this particular fact by adjusting its transmit power level autonomously in inverse proportion to the power it receives from the base station. To ensure that only large-scale variations are accounted for, open-loop power control is based on a long-term average of the measured received power.

The second power control mechanism is "closed-loop" power control. The closed-loop power control aims to compensate for the rapid signal strength variations caused by multipath propagation and sudden shadowing effects that cannot be compensated for by the slower open loop power control. The closed-loop power control also compensates for changes in interference level.

Figure 1:
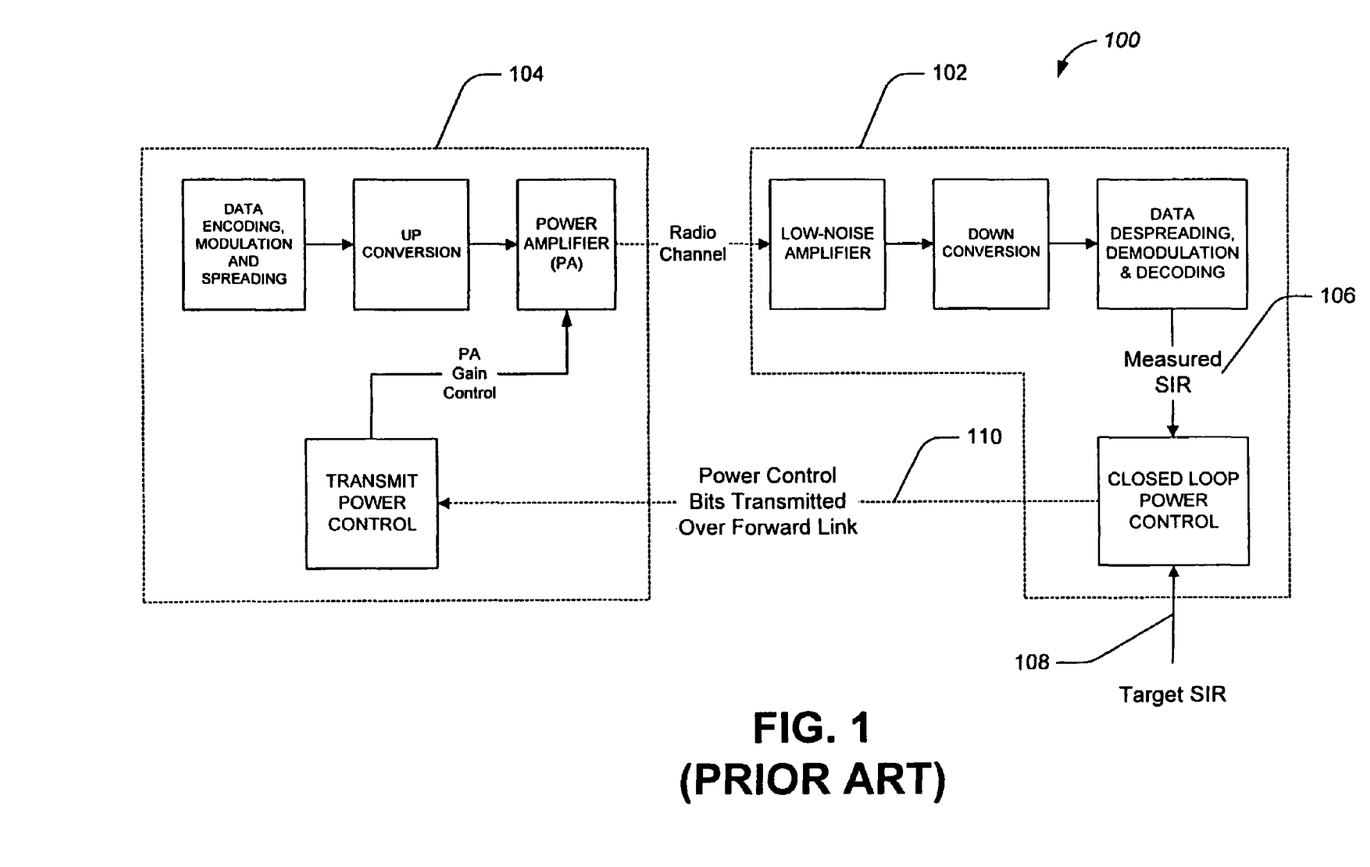
FIG. 1 is a block diagram of a conventional closed-loop power control.

The closed-loop power control 100 involves both the base station 102 and the mobile station 104 in a feedback loop arrangement, as illustrated in FIG. 1. The system time is divided into basic power control (PC) periods with duration $T_{PC}$. In each such PC period, the base station 102 computes a short-term average of the power received from the mobile 104, as well as the power from interfering transmitters. The ratio of these two measurements constitutes the measured SIR value 106 for that period. The measured SIR value 106 is then compared to the target SIR value 108 for that period. Based on this comparison, the base station 102 computes a suitable power correction command 110, which is then transmitted back to the mobile 104 over the forward link. The mobile 104 will thus adjust its transmit power once every PC period.

In order to maintain the lowest possible delay in the PC loop, power correction commands are not protected by error correction coding. Moreover, in order to minimize the forward link capacity loss due to correction commands, it is desirable to encode each command as a single bit. Depending on the value of the received PC bit, the mobile station 104 will then either increase or decrease its transmit power level by a predetermined amount, referred to as the PC step size.

The ability of the closed power control loop 100 to respond to rapid changes in received power level is limited by the PC bit rate $1/T_{PC}$, the step size, and the loop delay. The loop delay is the time elapsed between the generation of a PC bit in the base station 102 and the observation of the corresponding change of received power on the base station side.

Figure 2:
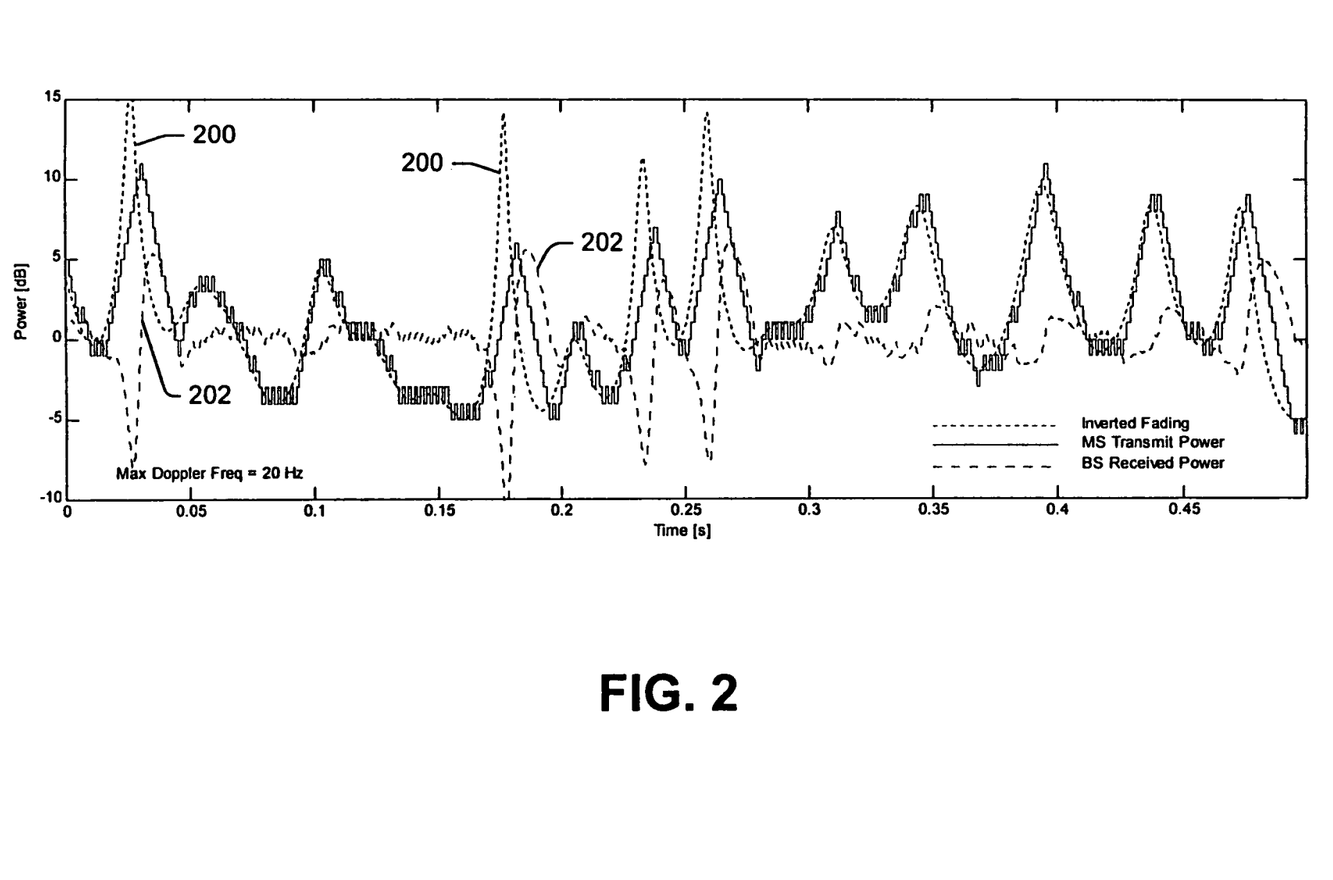
FIG. 2 shows the transmitted and received power and the inverted fading amplitude using the conventional closed loop power control.

However, substantial compensation of the multipath fading is only possible at comparatively low fading rates. FIG. 2 illustrates this point for the case of IS-95/IS-2000 with a two-path Rayleigh fading channel and maximal-ratio combining in the base station receiver. The two independently fading paths are simulated using Jake's multipath model, with the mean power of the second path being set to 3 dB below that of the first path and a maximum Doppler frequency ($f_D$) of 20 Hz. Jake's model configures fading amplitude as a Rayleigh random variable. In Jake's model, the distribution of received power along the Doppler frequency axis takes on a U-shape from $-f_D$ to $+f_D$. This gives a fading rate of roughly two times $f_D$ (40 Hz).

FIG. 2 shows the transmitted and received power and the inverted fading amplitude. The target received power level is 0 dB. In IS-95/IS-2000, the base station transmits a power control bit every $T_{PC}$=1.25 ms, at a rate of 800 bits/s. The step size is 0.25, 0.5 or 1.0 dB, controlled by the base station via messaging. The loop delay is determined by implementation-dependent factors in the mobile station as well as the round-trip propagation delay. The delay may even be time varying, due to the fact that the power control bit transmission times are pseudo-randomized. Typically, the loop delay is between one and two PC periods.

For the example of FIG. 2, the step size is set to 1 dB and the loop delay to one PC period (1.25 ms). Even with closed-loop power control, deep fades 200 occur frequently. Further, it can be observed that after each deep fade, there is a considerable overshoot 202 in the received power, due to the delayed response of the PC loop. However, the FER is primarily determined by the frequency and duration of the fades, which is equivalent to the time spent below the target power level. Hence, these overshoots 202 constitute a significant waste of transmit power for the mobile station, while contributing to the total interference level on the base station side.

SUMMARY

The inventors recognized a need for an enhanced power control system to obviate the above-discussed difficulties. The system has a capability to generate transmit power level based on short-term statistics of the previous transmit power levels.

The power control system includes a run-length counter and a processor. The counter is configured to receive and count power up commands indicating commands to increase power, and to generate a run-length count. The processor provides a transmit power level based on comparison of previous power levels and the run-length count with specified thresholds.

BRIEF DESCRIPTION OF THE DRAWINGS

Different aspects of the disclosure will be described in reference to the accompanying drawings wherein.

DETAILED DESCRIPTION

The present disclosure provides for controlling the transmit power in a mobile station based on some statistical properties of the power control bits received from a base station. The power adjustments performed by the mobile station are modified in such a way, that the above-mentioned positive excursions in the power received by base station are substantially reduced without seriously degrading the Frame Error Rate (FER). The power is adjusted in such a way that the average time spent below the target Signal-to-Interference Ratio (SIR) does not change significantly. By an appropriate choice of parameter values, a slight degradation of FER can be traded for significant reduction of average transmit power. The level of FER degradation that can be tolerated depends on the type of traffic, as well as on the frame error rate itself. For example, in voice transmission, the user may not even perceive a FER increase from 1% to 2%, whereas an increase from 2% to 4% typically would lead to a clearly noticeable voice quality reduction. In general, increasing the FER by more than a factor of two is undesirable, since this may cause the base station to increase its target Signal-to-Interference, which would counteract the intended purpose. A reduction of the average transmit power can significantly increase the talk time because the power consumption in a mobile station during an ongoing call is dominated by the power amplifier (PA) stage. Furthermore, a significant reduction of the total reverse link interference level can be obtained if several mobile stations simultaneously employ the alternative method. When the capacity of a CDMA system is limited by the reverse link, as is often the case, the reduction of interference level translates directly into a capacity increase.

The fading process created by multipath propagation typically exhibits a stationary behavior over distances corresponding to a few tens of wavelengths. Even when the mobile is traveling at high speed, the fading amplitude will maintain relatively stable mean level, standard deviation and fading rate over multiple frames. Therefore, the transmitting mobile station has no means of observing directly the fading process experienced by the receiving base station. However, since the closed-loop power control exercised by the base station attempts to track the fading, the power control bits transmitted back to the mobile can be used to extract information about the fading process. The power control bits, if appropriately processed, can also be used to extract information about changes in the interference level. The information can then be used by the mobile unit to change the behavior of the power control loop.

The information may include certain short-term statistical parameters extracted from the closed-loop transmit power process over multiple PC periods to modify its response to the next PC bit. For example, let b(n) denote the power control (PC) bit received by the mobile in the n-th PC period, where b(n) is assumed to take on the values +1 or −1, with the value +1 indicating a power up command and the value −1 indicating a power down command. Further, let P(n) denote the power level transmitted in the n-th PC period. Upon receiving PC bit b(n), the mobile station determines a power correction d(n) and then adjusts the transmit power according to $$P(n)=P(n-1)+d(n). \tag{1}$$

Since normally the power amplifier (PA) gain can only be adjusted in fixed steps, the power correction d(n) is set to an integer multiple of the step size, $\Delta$.

The power correction d(n) can be determined as follows. In each PC period, the mobile station updates a running estimate of the mean, the standard deviation, and the pitch (i.e. fundamental frequency component) of the transmit power process {P(n)}. These values are denoted as $\mu$, $\sigma$ and $f_p$, respectively. After receiving a PC bit b(n), the mobile station counts the current number of consecutive power up commands. This number is the power up run-length, U(n). More specifically, the power up run-length at time n is given by $$U(n) = \begin{cases} 0 & \text{if } b(n) = -1 \\ U(n-1) + 1 & \text{if } b(n) = +1 \end{cases} \quad (2)$$

The new power correction d(n) is a function of the value of the previous corrections, d(n−1), d(n−2), . . . , the previous power level, P(n−1), the power up run-length, U(n), and the step size, $\Delta$. Moreover, the function is not fixed, but is adapted with respect to the short-term statistical parameters obtained in the above step.

Figure 3:
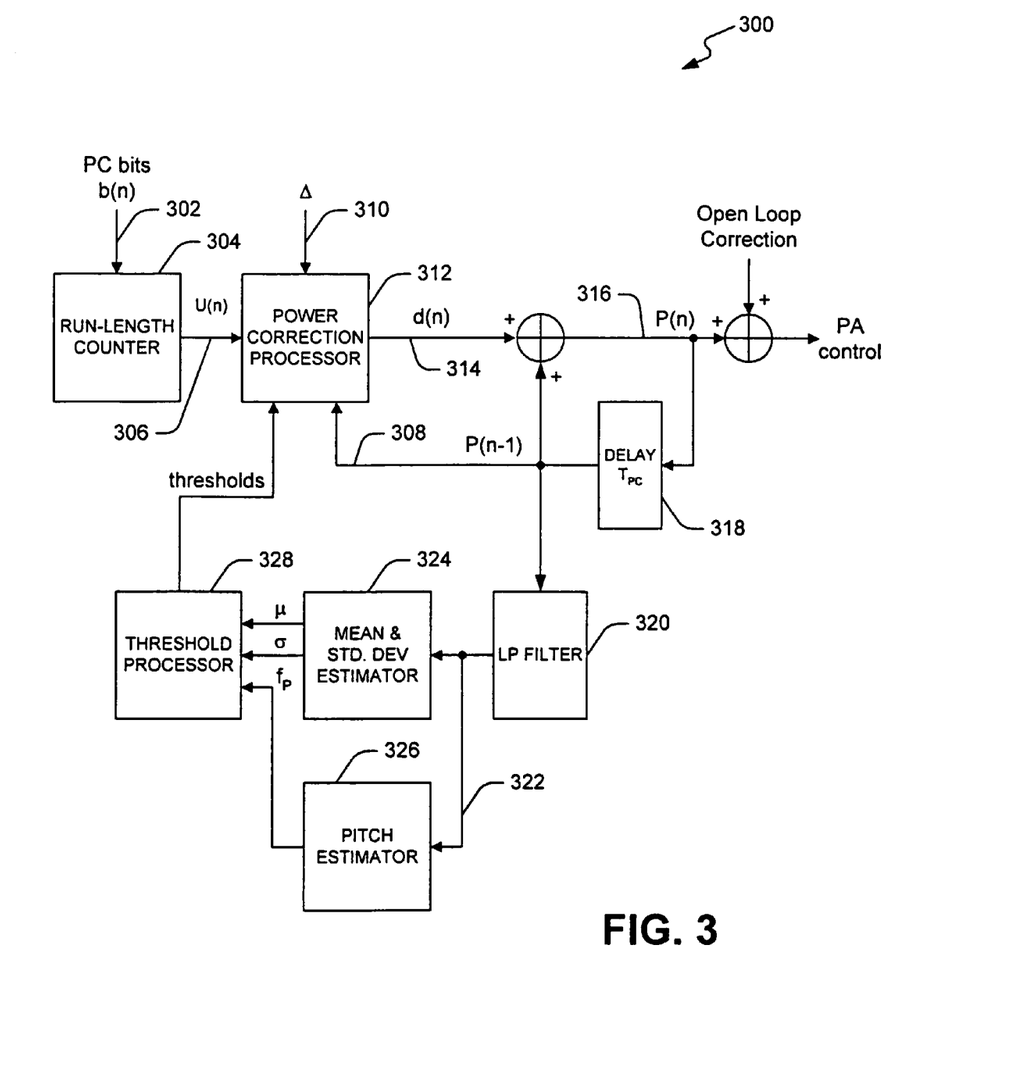
FIG. 3 is a block diagram of a power controller according to one embodiment of the present disclosure.

A power controller 300 according to a preferred embodiment of the present disclosure is shown in FIG. 3. The incoming stream of PC bits 302 drives a power up run-length counter 304 according to Equation (2). The run-length counter value U(n) 306, the previous transmit power level P(n−1) 308, and the step size $\Delta$ 310 form the input to a power correction processor 312. This input generates the next correction d(n) 314. The previous transmit power level P(n−1) 308 is provided by time-delaying the current power level P(n) 316 through a delay element 318, such as a buffer or a flip-flop. The power correction processor 312 selects the correction from a set of tabulated values, based on the outcome of a comparison of U(n) and P(n−1) with a set of thresholds. The selection may also depend on a number, say L, of the previous corrections d(n−1), d(n−2), . . . , d(n−L). Therefore, the power correction processor can be implemented as a state-machine, in which the state is determined by the L previous corrections.

A possible state-machine characteristic according to one embodiment is given in Table 1. In this embodiment, the state is determined by the most recent correction d(n−1) only. The set of correction values is 0, ±$\Delta$ and −2$\Delta$. The power correction processor 312 is in the "Normal" state when the previous correction d(n−1) was +$\Delta$. The processor 312 is in the "Hold" state when the previous correction was zero. Finally, the power correction processor 312 is in the "Quick-Drop" state when previous correction was −2$\Delta$.

In this particular embodiment, three thresholds are used. Two power thresholds $\Gamma_1$, $\Gamma_2$ and a run-length threshold $\Lambda$. It is assumed that $\Gamma_1 \geq \Gamma_2$. According to Table 1, the power correction processor 312 will remain in the Normal state at long as P(n−1) 308 does not exceed the

TABLE 1

| Previous State | Condition | New State | Correction d(n) |
|---|---|---|---|
| Normal | P(n − 1) ≤ $\Gamma_1$ OR U(n) ≤ $\Lambda$ | Normal | b(n) · $\Delta$ |
| Normal | P(n − 1) > $\Gamma_1$ AND U(n) > $\Lambda$ | Hold | 0 |
| Normal | P(n − 1) > $\Gamma_1$ AND U(n) = 0 | Quick-Drop | −2$\Delta$ |
| Hold | U(n) > 0 | Hold | 0 |
| Hold | U(n) = 0 | Quick-Drop | −2$\Delta$ |
| Quick-Drop | P(n − 1) > $\Gamma_2$ AND U(n) = 0 | Quick-Drop | −2$\Delta$ |
| Quick-Drop | P(n − 1) ≤ $\Gamma_2$ OR U(n) > 0 | Normal | b(n) · $\Delta$ | upper power threshold $\Gamma_1$ or U(n) 306 does not exceed the run-length threshold $\Lambda$. When P(n−1) 308 exceeds $\Gamma_1$ and U(n) 306 exceeds $\Lambda$, the power correction processor 312 will transition to the Hold state. The processor 312 will remain in the Hold state until U(n) 306 is reset, at which time the first power down command is received. It will then transition to the Quick-Drop state and remain in this state until P(n−1) 308 falls below the lower power threshold $\Gamma_2$, at which point it will transition back to the Normal state.

In order to ensure a consistent behavior of the power control loop under different fading conditions, the thresholds must be made to depend on the distribution and pitch of the transmit power process. As discussed above, these statistics will vary over time but can be considered short-term stationary. Therefore, previously transmitted power levels 308 are first filtered in a low-pass filter 320 to remove rapid variations due to multi-user interference and the staircase nature of the power corrections. The low-pass filtered power levels 322 are then fed to an estimator 324, which generates short-term estimates of the mean ($\mu$) and standard deviation ($\sigma$). A second estimator 326 is used to generate a short-term estimate of the pitch ($f_p$) of the low-pass filtered power process. A threshold processor 328 uses the short-term statistical parameters to compute the threshold values used by the power correction processor 312. The two power thresholds should be set with respect to the distribution of the closed-loop transmit power. For one embodiment, a suitable choice of power threshold settings is $$\Gamma_1 = \mu + k_1 \sigma$$

$$\Gamma_2 = \mu + k_2 \sigma \quad (3)$$

where $k_1$ and $k_2$ are constants. For another embodiment, the run-length threshold setting should be based on the estimated pitch $f_p$ of the closed-loop transmit power. A suitable run-length threshold setting is $$\Lambda = \frac{\Lambda_{ref} + k_3 \frac{f_{ref} - f_p}{f_p}}{\Delta} \quad (4)$$

where $\Lambda_{ref}$ is the run-length threshold for an arbitrary

TABLE 2

| Parameter | Value |
|---|---|
| $\Delta$ | 1 dB |
| $k_1$ | 1 |
| $k_2$ | 0 |
| $k_3$ | 1 |
| $\Lambda_{ref}$ | 5 |
| $f_{ref}$ | 100 Hz | reference pitch frequency with $\Delta$=1 dB, and $k_3$ being a constant.

Figure 4:
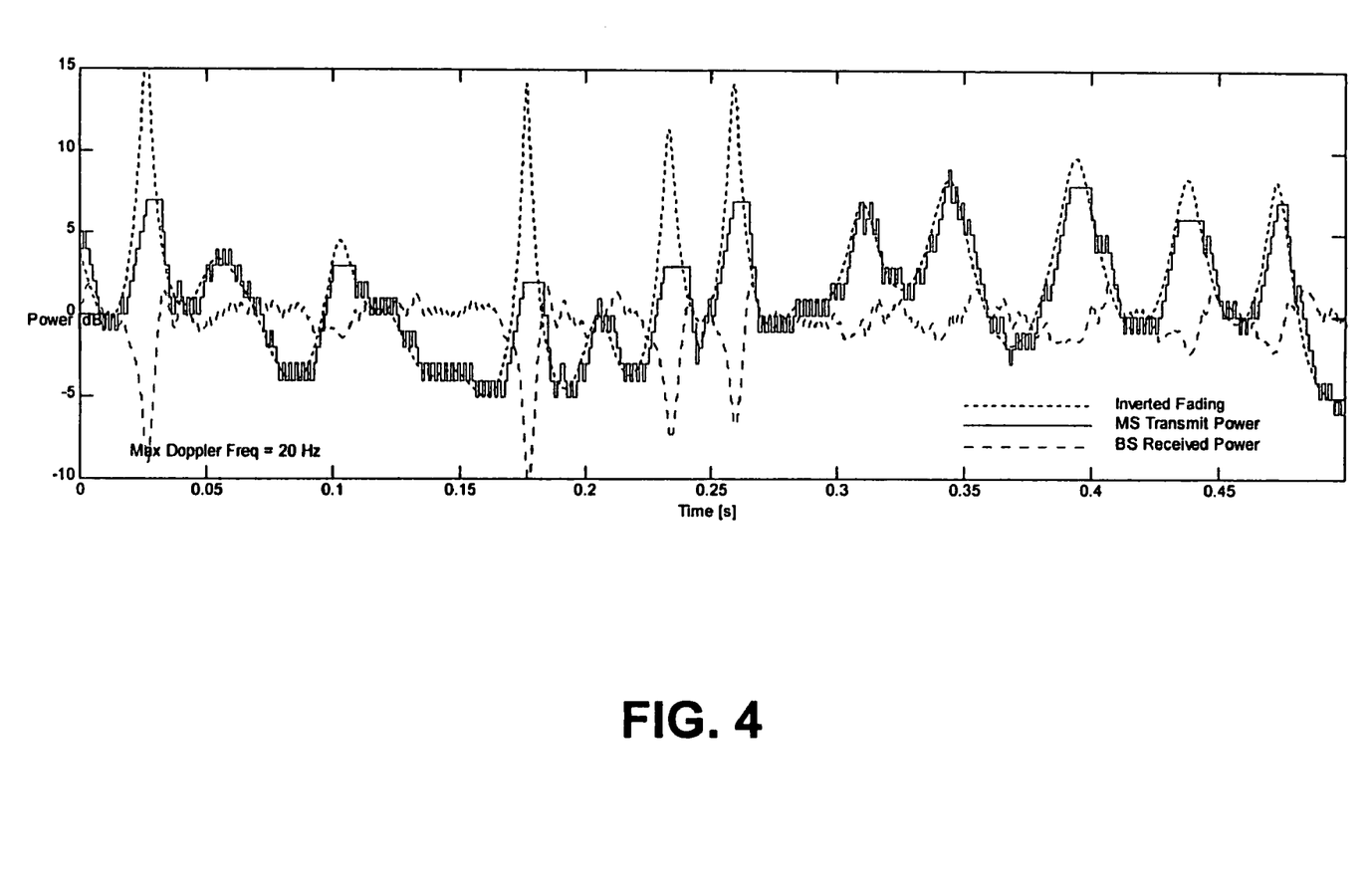
FIG. 4 shows the transmitted and received power and the inverted fading amplitude using the power controller of the present disclosure.

FIG. 4 shows the simulated performance of the power controller 300 with the PC bits processed according to the embodiment in FIG. 3 and the state-machine in Table 1. The multipath fading and system parameters are identical to those used in FIG. 2. The adaptation of thresholds was performed according to Equations (3) and (4), using the parameter values given above in Table 2. Further, the upper limit on the number of successive Hold states was set to 10. Comparing FIGS. 2 and 4, it can be observed that the overshoots 202 in the received power have been substantially reduced in FIG. 4 with the new method performed by the power controller 300.

Figure 5A:
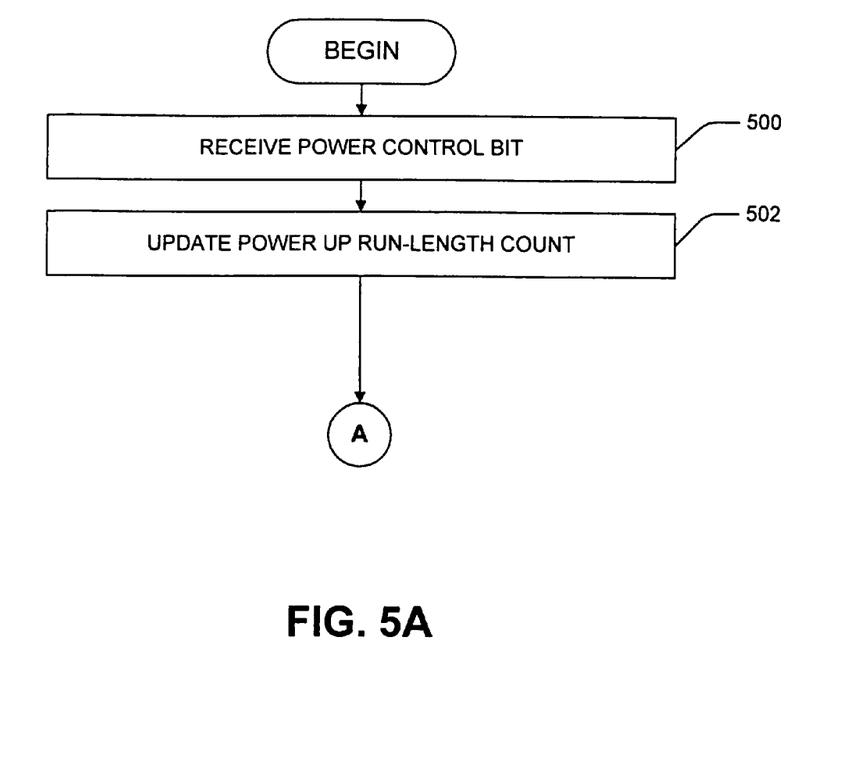
FIGS. 5A and 5B show a modified power control process performed by the power controller of the present disclosure.
Figure 5B:
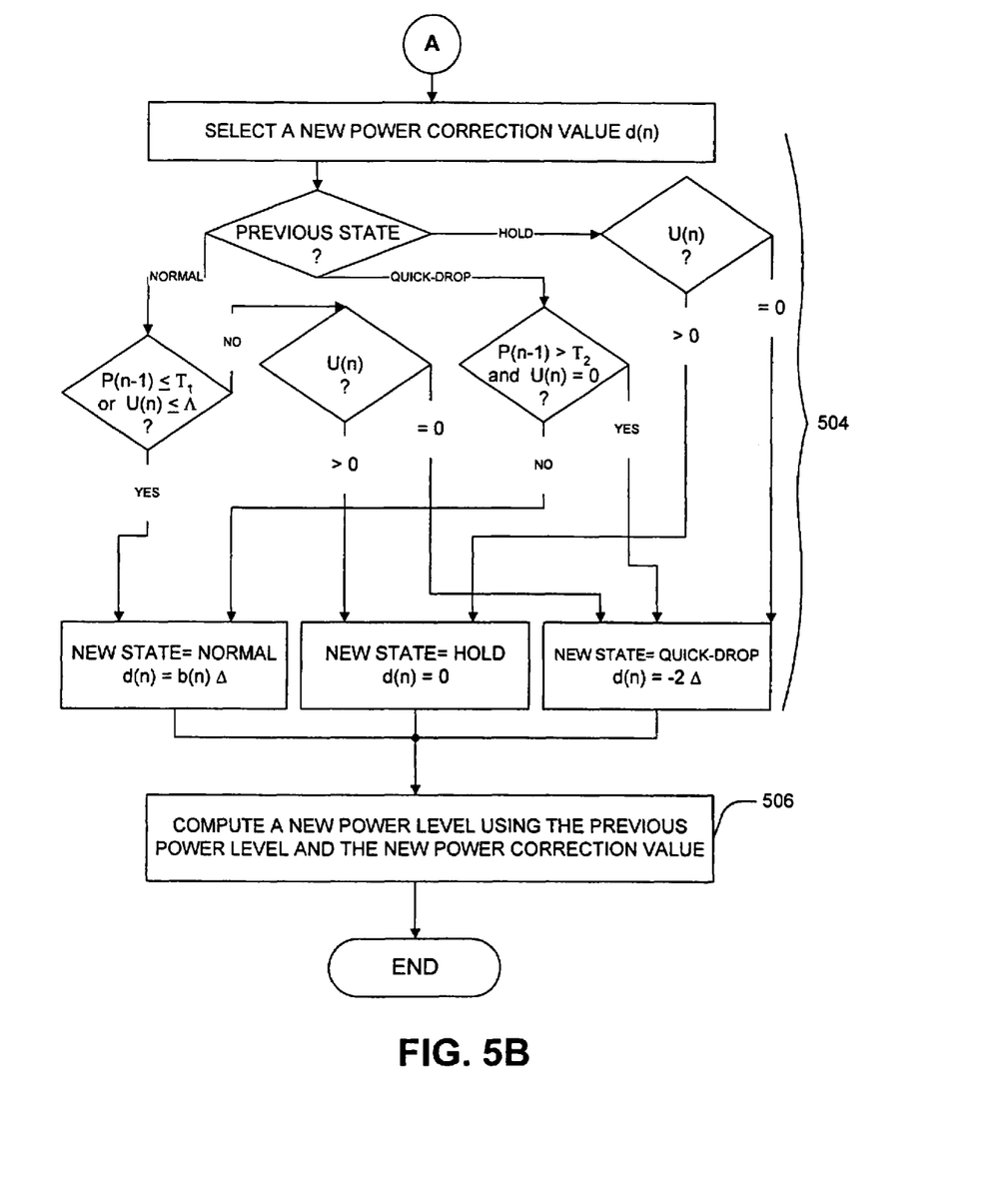

One embodiment of a modified power control process performed by the power controller 300 is shown in FIGS. 5A and 5B. The controller 300 receives a power control bit, at step 500. At step 502, the power up run-length count is updated. The power correction processor 312 then selects a new power correction value d(n) from a set of tabulated values (see Table 1) based on the outcome of a comparison of the power up run-length count and the previous power level with a set of thresholds.

Step 504 shows the processor 312 remaining in the Normal state as long as the previous power level does not exceed the upper power threshold $\Gamma_1$, or the run-length count does not exceed the run-length threshold $\Lambda$. When the previous power level exceeds $\Gamma_1$ and the run-length count exceeds $\Lambda$, the power correction processor 312 will transition to the Hold state. The processor 312 will remain in the Hold state until the run-length count is reset. It will then transition to the Quick-Drop state and remain in this state until the previous power level falls below the lower power threshold $\sigma_2$, at which point it will transition back to the Normal state.

Finally, the controller 300 computes a new power level for the mobile power amplifier using the previous power level and the new power correction value, at step 506.

Figure 6:
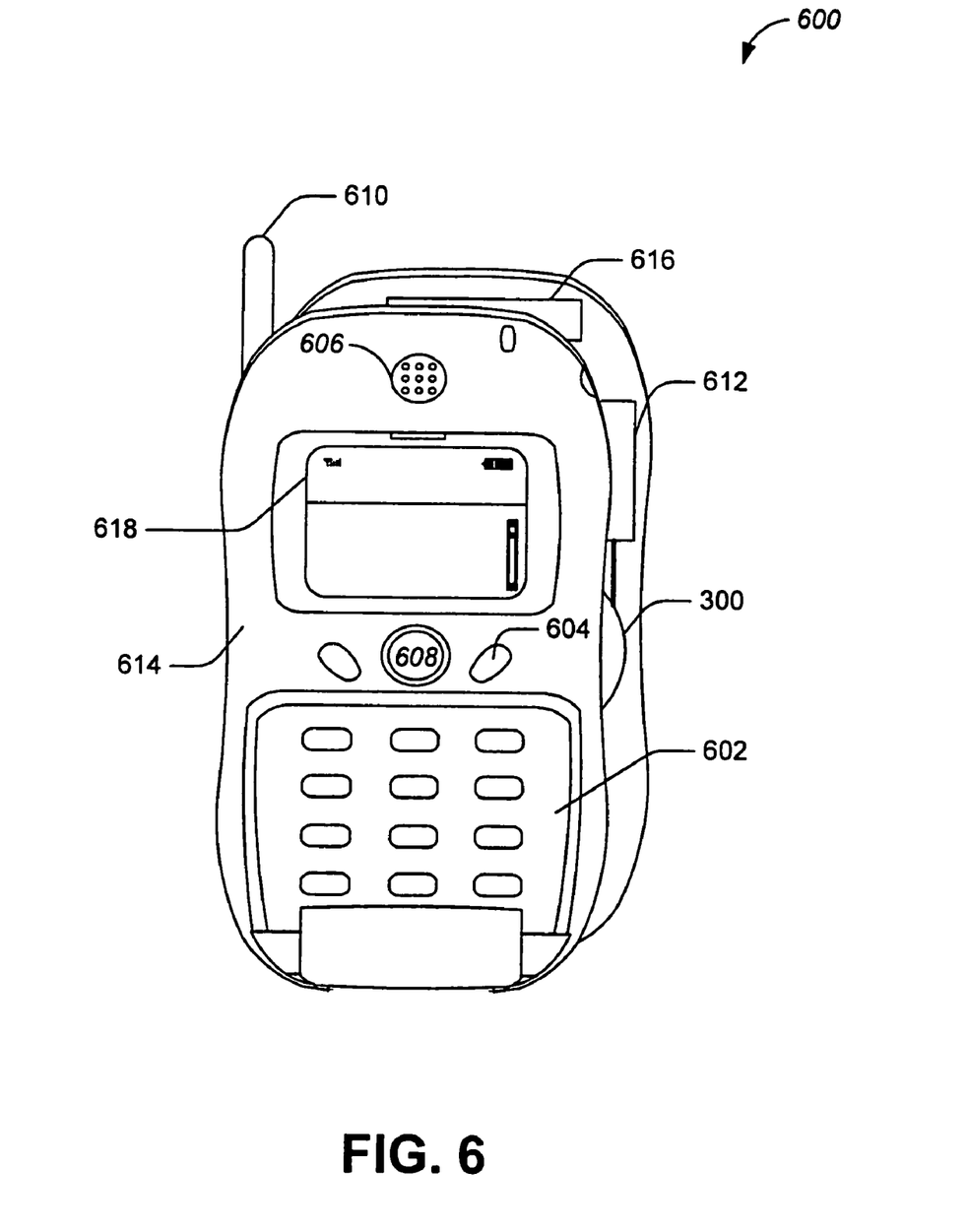
FIG. 6 is a front perspective view of a cellular telephone using the power controller of the present disclosure.

FIG. 6 shows an exploded view of a cellular telephone 600 according to one embodiment of the present disclosure. The phone 600 uses the power controller 300 described above for controlling the power level of the power amplifier 612. The cellular telephone 600 also includes a keypad 602 and various other buttons and indicators 604. The telephone 600 also includes a speaker 606, a microphone 608, an antenna 610, and other communication electronics 616 contained within a telephone housing 614. A display unit 618 is used in conjunction with the keypad 602 to facilitate user inputs.

Figure 7:
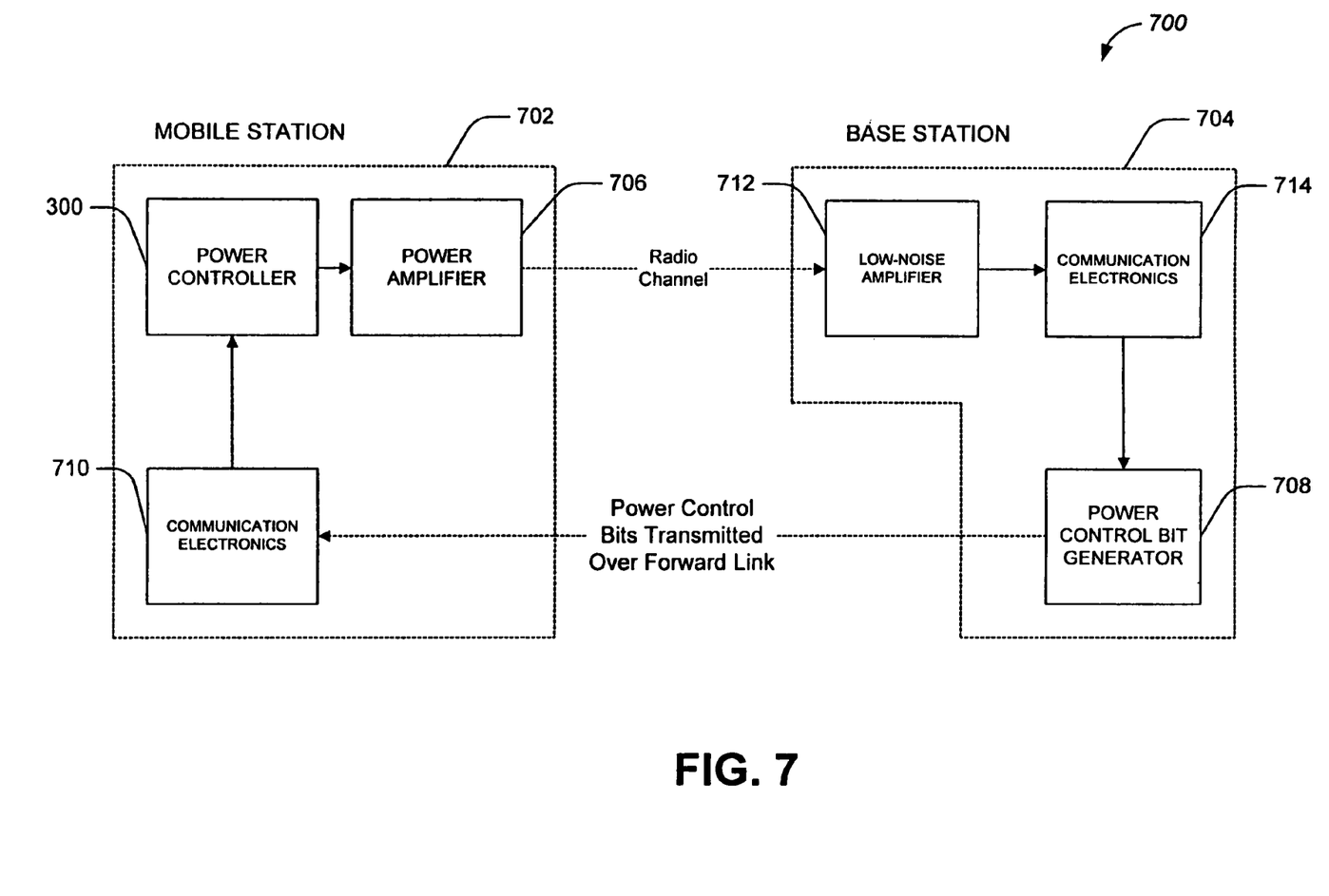
FIG. 7 is a block diagram of a wireless communication system having closed-loop power control in accordance with an embodiment of the present invention.

FIG. 7 is a block diagram of a wireless communication system 700 having closed-loop power control using the power controller 300 described in FIG. 3. A base station 704 receives a signal from a mobile station 702 through a radio channel. A low-noise amplifier 712 and communication electronics 714 in the base station 704 receives and down-converts the signal from the mobile station 702. A power control bit generator 708 measures the power level of the signal and generates a power control bit for a particular processing period. The power control bit sent over the forward link to the mobile station 702.

Communication electronics 710 in the mobile station 702 receives the power control bit. The power controller 300 then processes the power control bit. The power controller 300 generates a new power level for a power amplifier 706. The mobile station 702 transmits a next signal with the new power level.

Figure 8:
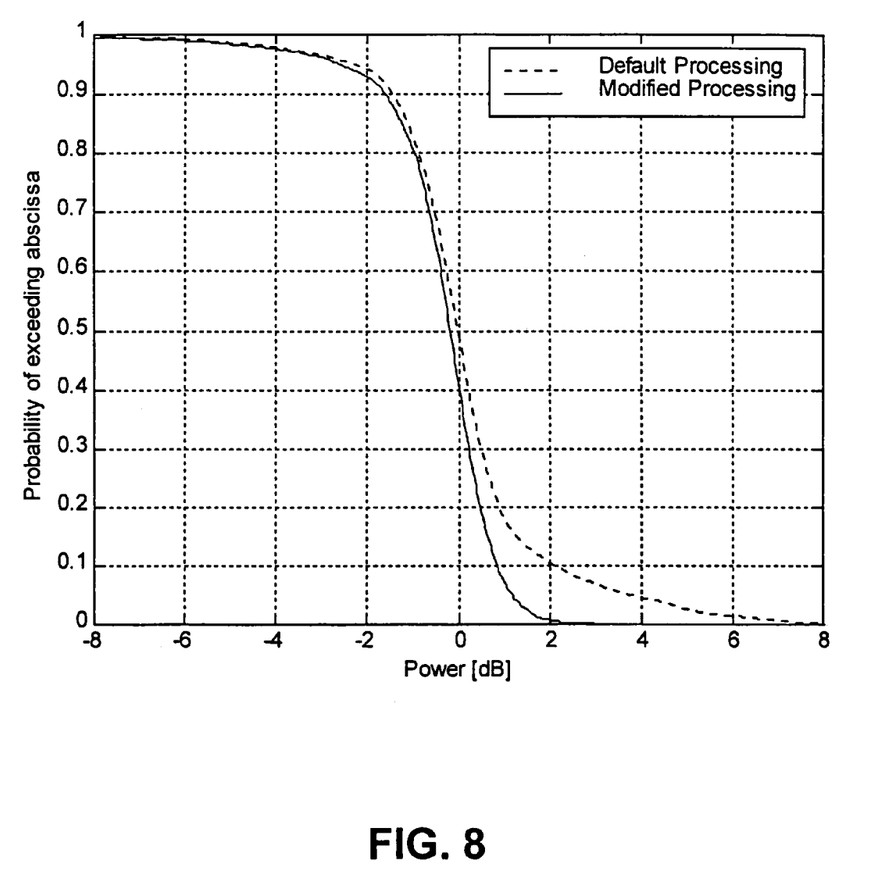
FIG. 8 shows comparison of the complementary cumulative distribution of the received power between conventional power control bit processing and modified processing performed by the power controller of the present disclosure.

FIG. 8 shows comparison of the complementary cumulative distribution of the received power (measured using histogram) between conventional PC bit processing and modified processing performed by the power controller 300. The effect of the modified processing is to shape the distribution of received power above the target power level (0 dB). A significant reduction in average received power level is shown when the conventional PC processing is replaced by the modified method.

Figure 9:
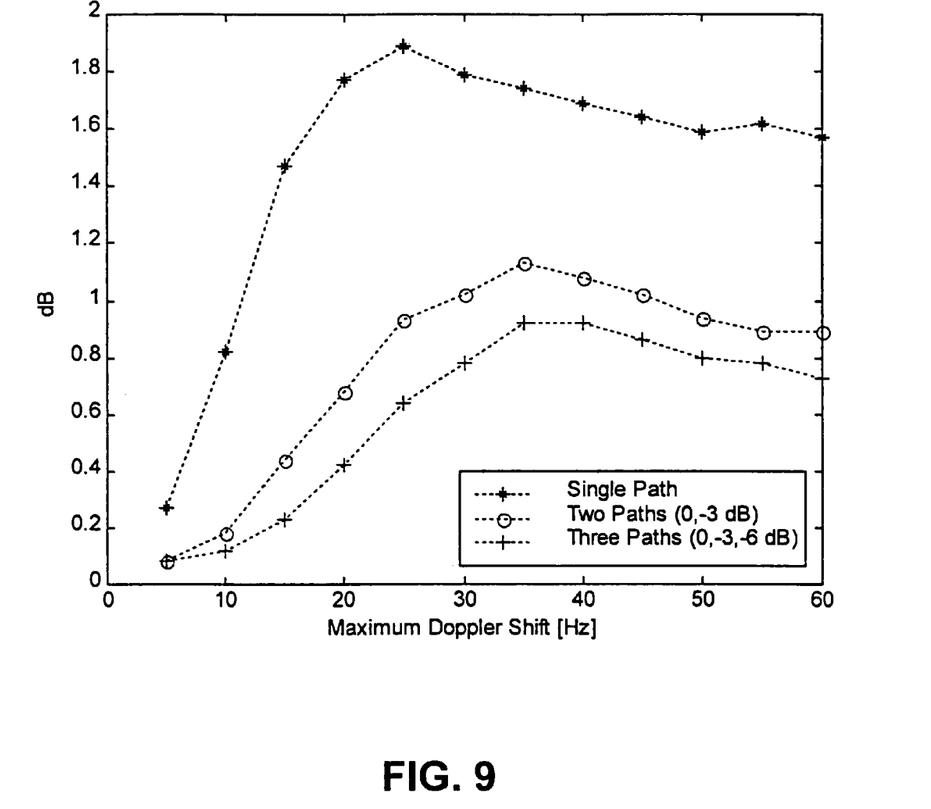
FIG. 9 is a plot showing the reduction of average received power level for three different Rayleigh fading channels with varying number of multipath components.

In FIG. 9, the reduction of average received power level, measure by simulation, has been plotted as a function of the maximum Doppler shift for three different Rayleigh fading channels with varying number of multipath components. For the two-path channel, the mean power of the second path is 3 dB below that of the first path. In the case of the three-path channel, the mean power of the second and third paths are 3 dB and 6 dB below that of the first path, respectively. The loop delay is one PC period. The achieved power reduction diminishes with increasing number of multipath components.

Figure 10:
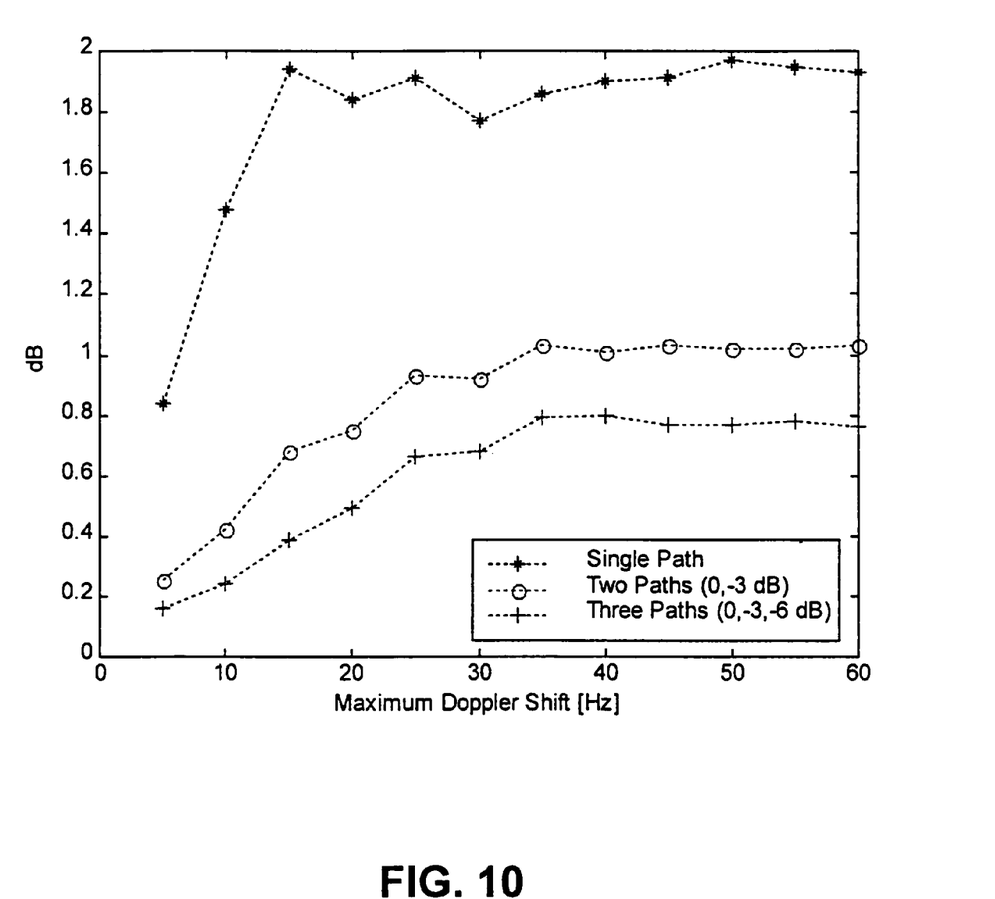
FIG. 10 is a plot showing the reduction of transmit power achieved when the conventional power control processing is replaced by the modified method.

FIG. 10 shows the reduction of transmit power achieved when the default PC processing is replaced by the modified method, as measured by simulation. The system and fading parameters are the same as for FIG. 9. Again, the dependence on the maximum Doppler shift and the number of multipath components is shown.

Other embodiments and variations are possible. For example, the power control loop can be modified in many different ways by changing the number of correction steps ($\Delta$) taken in the Normal, Hold, and Quick-Drop states, as well as by introducing additional states. Further, the estimation of the mean and standard deviation can be carried out by using standard statistical processing methods readily available in the literature. The accuracy of the pitch estimator is not critical, and several pitch estimation algorithms well known from signal processing literature could be applied. The simple computation of a running average of the number of positive or negative zero crossings provide sufficient accuracy. The time constant, or degree of averaging, used in computing these estimates should be set with respect to the expected maximum rate of change of the fading statistics. In urban areas, rapid changes in the fading statistics may occur, e.g. as the user rounds a street corner. To ensure that the power control loop is always capable of responding to a sudden drop in received power, it is appropriate to limit the number of successive Hold states that can be executed by the power correction processor. In this case, when the number of Hold states reaches the upper limit, the power correction processor will transition directly to the Normal state.

All these are intended to be encompassed by the following claims.

What is claimed is:

1. A power control system comprising:
   a run-length counter configured to adapted to receive power commands and operable to count only power up commands indicative of an increase in power, said counter operable to generate a run-length count signifying receive and count power up commands, except power down commands, indicating commands to increase power, said counter counting a number of consecutive power up commands on said power control bits to generate a run-length count; and
   a processor operating to provide a transmit power level based on comparison of previous power levels and said run-length count with specified thresholds.

2. The system of claim 1, further comprising:
   a threshold generator configured to generate said specified thresholds from statistics of said previous power levels.

3. The system of claim 2, wherein said short-term statistics include a mean, a standard deviation, and an estimated pitch.

4. The system of claim 2, wherein said previous power levels are low-pass filtered before said statistics are generated.

5. A power control system comprising:
   a memory configured to store a power correction value and a power level;
   a counter operating to receive a stream of power control bits, said counter counting a number of consecutive power up commands, except power down commands, on said power control bits; and
   a processor coupled to said memory and said counter, said processor operating to compute a new power correction value based on comparison of said stored power correction value, said stored power level, and said number of consecutive power up commands with specified threshold values.

6. The system of claim 5, wherein said transmit power correction value is 0, ±Δ, or −2, where Δ is a power correction step size.

7. The system of claim 5, further comprising:
a summing element configured to sum said stored power level with said new power correction value to provide a new power level.

8. The system of claim 5, further comprising:
an estimator configured to compute a mean, a standard deviation, and a pitch of said stored power level.

9. The system of claim 8, further comprising:
a threshold processor configured to receive said mean, said standard deviation, and said pitch from said estimator, to compute said specified threshold values.

10. The system of claim 8, further comprising:
a low-pass filter operating to filter said stored power level before being sent to said estimator.

11. The system of claim 8, wherein said specified threshold values include at least two power threshold settings based on said mean and said standard deviation, and at least one consecutive power up threshold setting based on said pitch.

12. A method for controlling power, comprising:
receiving a power control bit;
updating a power up run-length count according to said power control bit, wherein said updating comprises incrementing said power up run-length count if said power control bit indicates a power up command without decrementing said power up run-length count with a power down command, wherein said run-length count represents a number of consecutive power up commands, and wherein said updating comprises resetting said power up run-length count if said power control bit does not indicate a power up command;
selecting a power correction value based on comparison of said power up run-length count and a previous power correction value with specified thresholds; and
computing a transmit power level using a previous power level and said selected power correction value.

13. The method of claim 12, wherein said selecting a power correction value further includes keeping track of a state of a power controller, such that an initial default state is a Normal state.

14. The method of claim 13, wherein said power controller remains in the Normal state as long as the previous power level does not exceed a first threshold of said specified thresholds or said power up run-length count does not exceed a second threshold of said specified thresholds.

15. The method of claim 13, wherein said power controller transitions to a Hold state when the previous power level exceeds said first threshold and said power up run-length count exceeds said second threshold.

16. The method of claim 13, wherein said power controller transitions to a Quick-drop state when the previous power level exceeds said first threshold and said power up run-length count is reset.

17. The method of claim 16, wherein said power controller remains in the Hold state until said power up run-length count is reset, and transitions to a Quick-drop state when the count is reset.

18. The method of claim 17, wherein said power controller remains in the Quick-drop state until the previous power level falls below a third threshold of said specified thresholds or said power up run-length count is non-zero.

19. The method of claim 18, wherein said power controller transitions back to the Normal state if the previous power level falls below a third threshold of said specified thresholds or said power up run-length count is non-zero.

20. The method of claim 12, wherein said computing said transmit power level involves summing said previous power level and said selected power correction value.

21. A wireless telephone system comprising:
a housing;
communication electronics within the housing;
a power amplifier operating to provide a power level to said communication electronics; and
a power controller configured to control said power level provided by said power amplifier, said power controller including:
a run-length counter configured to receive and count consecutive power up commands, except power down commands, indicating commands to increase power, said counter generating a run-length count; and
a processor operating to provide a transmit power level based on comparison of previous power levels and said run-length count with specified thresholds.

22. The system of claim 21, further comprising:
a threshold generator configured to generate said specified thresholds from short-term statistics of said previous power levels.

23. A closed-loop power control system for a wireless communication, comprising:
a plurality of mobile stations each having a power controller, said power controller including a run-length counter configured to receive and count power up commands, except power down commands, indicating commands to increase power, said counter generating a run-length count composed of a number of consecutive power up commands; and
a base station configured to measure received power level from said plurality of mobile stations, and to send power up or power down command, such that said power controller adjusts a transmit power level based on comparison of a previous transmit power level and a power up command count with specified thresholds.

24. The system of claim 23, wherein said power controller further includes a processor operating to provide a transmit power level based on comparison of previous power levels and said run-length count with specified thresholds.

* * * * *